(12) United States Patent
Hall et al.

(10) Patent No.: US 9,655,309 B1
(45) Date of Patent: May 23, 2017

(54) ROOFTOP GREENHOUSE INSIDE ROOF INFRASTRUCTURE

(71) Applicants: David R. Hall, Provo, UT (US); Benjamin Jensen, Orem, UT (US); Max Tarver, Provo, UT (US); Clayton Kimball, Holiday, UT (US); Eimi Priddis, Mapleton, UT (US)

(72) Inventors: David R. Hall, Provo, UT (US); Benjamin Jensen, Orem, UT (US); Max Tarver, Provo, UT (US); Clayton Kimball, Holiday, UT (US); Eimi Priddis, Mapleton, UT (US)

(*) Notice: Subject to any disclaimer, the term of this patent is extended or adjusted under 35 U.S.C. 154(b) by 0 days.

(21) Appl. No.: 15/168,557

(22) Filed: May 31, 2016

(51) Int. Cl.
| | | |
|---|---|---|
| B66B 9/00 | (2006.01) |
| A01G 9/10 | (2006.01) |
| E04B 1/343 | (2006.01) |
| E04B 1/76 | (2006.01) |
| E04D 11/00 | (2006.01) |
| A01G 9/02 | (2006.01) |
| A01G 9/24 | (2006.01) |
| A01G 9/20 | (2006.01) |
| A01G 31/02 | (2006.01) |

(52) U.S. Cl.
CPC ............ *A01G 9/1066* (2013.01); *A01G 9/02* (2013.01); *A01G 9/021* (2013.01); *A01G 9/1073* (2013.01); *A01G 9/20* (2013.01); *A01G 9/24* (2013.01); *A01G 9/246* (2013.01); *A01G 9/247* (2013.01); *A01G 31/02* (2013.01); *E04B 1/3431* (2013.01); *E04B 1/76* (2013.01); *E04D 11/00* (2013.01)

(58) Field of Classification Search
CPC ........ A01G 9/1066; A01G 9/021; A01G 9/02; A01G 9/1073; A01G 9/247; A01G 9/246; A01G 9/20; A01G 31/02; A01G 9/24; E04B 1/76; E04B 1/3431; E04D 11/00
USPC .................................................. 52/29, 302.1
See application file for complete search history.

(56) References Cited

U.S. PATENT DOCUMENTS

| | | | | |
|---|---|---|---|---|
| 4,118,892 | A * | 10/1978 | Nakamura ............. | A01G 9/025 220/23.4 |
| 4,151,680 | A * | 5/1979 | Sena ...................... | A01G 9/022 47/39 |
| 4,291,493 | A * | 9/1981 | Monson ................. | A01G 31/02 47/14 |
| 4,291,494 | A * | 9/1981 | Knablein ................ | A01G 9/16 206/558 |
| 4,299,054 | A * | 11/1981 | Ware ..................... | A01G 31/02 47/56 |

(Continued)

*Primary Examiner* — Basil Katcheves

(57) ABSTRACT

A rooftop greenhouse built into a roof infrastructure is disclosed. The roof infrastructure is constructed from conjoining modular building segments. The conjoining modular building segments are prismatic box-like structures, each having at least three walls, and the prismatic box-like structures are arranged and attached horizontally to create the roof of a building infrastructure. Inside each prismatic box-like structure is a displaceable garden box and a mechanism for lifting the garden box out of the prismatic box-like structure. The prismatic box-like structures and garden boxes may also be equipped with glass ceilings, thin insulation, mirrors, a growing medium, a grid system, an automated water supply system, an automated gas supply system, an automated temperature control system, an automated shading and light control device, and artificial lighting.

18 Claims, 16 Drawing Sheets

(56) References Cited

U.S. PATENT DOCUMENTS

| | | | | |
|---|---|---|---|---|
| 4,531,324 A * | 7/1985 | Yang | A01H 4/001 | 47/59 R |
| 4,926,586 A * | 5/1990 | Nagamatsu | E04D 11/002 | 47/65.9 |
| 4,961,284 A * | 10/1990 | Williams | A01G 9/022 | 47/66.5 |
| 5,050,755 A * | 9/1991 | Strawder | B65D 21/0202 | 220/23.4 |
| 5,187,894 A * | 2/1993 | Ripley, Sr. | A63C 19/00 | 47/59 R |
| 5,419,080 A * | 5/1995 | Buss | A01G 9/104 | 47/73 |
| 5,467,555 A * | 11/1995 | Ripley, Sr. | E01C 13/083 | 220/7 |
| 5,564,226 A * | 10/1996 | Paramest | A01G 9/02 | 47/71 |
| 5,581,936 A * | 12/1996 | Belgiorno | A01G 9/10 | 47/18 |
| D409,947 S * | 5/1999 | Bongard | D11/155 | |
| 5,953,859 A * | 9/1999 | Cochran | A01G 9/028 | 47/41.1 |
| 6,536,361 B1 * | 3/2003 | Wu | A01G 1/007 | 111/114 |
| 7,726,071 B2 * | 6/2010 | Carpenter | E04D 11/002 | 47/65.9 |
| 8,122,682 B2 * | 2/2012 | Mischo | E04D 7/005 | 47/66.1 |
| 8,132,367 B2 * | 3/2012 | Cottier | A01G 9/02 | 47/83 |
| 8,707,618 B2 * | 4/2014 | MacKenzie | A01G 1/002 | 47/65.7 |
| 8,739,497 B2 * | 6/2014 | Meuser | E04D 1/30 | 52/302.1 |
| 8,959,834 B2 * | 2/2015 | Hashimoto | A01G 9/025 | 47/63 |
| 9,265,200 B2 * | 2/2016 | Buist | A01G 1/007 | |
| 2005/0155287 A1 * | 7/2005 | Phillips | A01G 9/02 | 47/66.1 |
| 2007/0094927 A1 * | 5/2007 | Perry | A01G 1/007 | 47/65.9 |
| 2008/0302006 A1 * | 12/2008 | Hurkx | A01G 31/06 | 47/61 |
| 2009/0320364 A1 * | 12/2009 | MacKenzie | A01G 1/002 | 47/65.9 |
| 2010/0095586 A1 * | 4/2010 | Sichello | E04F 13/0801 | 47/65.9 |
| 2011/0030274 A1 * | 2/2011 | Buist | A01G 1/007 | 47/65.6 |
| 2011/0036008 A1 * | 2/2011 | Hashimoto | A01G 9/025 | 47/82 |
| 2011/0192084 A1 * | 8/2011 | MacKenzie | A01G 9/025 | 47/83 |
| 2012/0186148 A1 * | 7/2012 | Chang | A01G 9/027 | 47/41.01 |
| 2012/0240463 A1 * | 9/2012 | Bindschedler | A01G 1/007 | 47/65.7 |
| 2014/0325904 A1 * | 11/2014 | Brown | A01G 9/02 | 47/65.5 |

* cited by examiner

ROOFTOP GREENHOUSE INSIDE ROOF INFRASTRUCTURE

TECHNICAL FIELD

This invention relates generally to the field of construction of buildings and other structures, and more specifically to rooftop greenhouses.

BACKGROUND

It is common knowledge that all plants need a few things to grow: water, sunlight, and the nutrients that are usually found in soil. However, some plants require more or less of these essential elements than others. Different plants are adapted to different growing environments. Therefore, in order to maximize growing potential, greenhouses were invented, where climatic conditions can be controlled so that specialized growing environments can be created almost anywhere.

Some people maintain greenhouse gardens for a hobby, and others do so for a livelihood. One of the challenges for many people, though, is finding a space to put a greenhouse. This is especially true in sprawling urban environments, where many live in housing complexes that lack areas for individual yards or gardens. One solution to this problem has been to put greenhouses on rooftops. Not only is this a solution for space, but it also improves the greenhouses. Greenhouses normally do not store heat that is gained during the day to warm the greenhouse interior throughout the night. However, buildings can store heat throughout the day and slowly release it through the roof at night. Such heat would usually go to waste, but a rooftop greenhouse can absorb and benefit from that heat. The building also benefits because the greenhouse helps to insulate the roof.

In this way, rooftop greenhouses have contributed to making buildings more green and sustainable. Yet, despite the advantages of a rooftop greenhouse, one disadvantage is that the rooftop space is lost. In harsher climates, rooftop greenhouses might interfere with the drainage of moisture that accumulates on the roof. Furthermore, though a building might have many occupants, there is only one roof, and, therefore, only one greenhouse. On the other hand, a large number of occupants might desire a large variety of different greenhouse growing environments. In addition, though a rooftop greenhouse does, in spite of its weaknesses, contribute to making a building green and sustainable, an average building has other weaknesses that prevent it from being optimally green and sustainable, such as wasted space.

In light of the foregoing, what is needed is a rooftop greenhouse that is built into the building infrastructure. This would leave the rooftop space available, but make use of an area of wasted space between the roof and the ceiling in buildings that is almost always left unutilized. Such a rooftop greenhouse would ideally have many individual pieces that could be separately controlled by different individuals and allow for the creation of a variety of growing environments for a variety of plants. Finally, this rooftop greenhouse would also need to retain the benefits of a typical greenhouse, including regulated row sizes, so that all areas of the garden would be within reach, and raised garden beds, preventing back strain.

SUMMARY OF THE INVENTION

The disclosed invention has been developed in response to the present state of the art and, in particular, in response to the problems and needs in the art that have not yet been fully solved by currently available components and methods. Accordingly, structural components and methods have been developed to allow a rooftop greenhouse to be built into the infrastructure of a roof, thereby maximizing the efficient use of space within the building.

Consistent with the foregoing, a rooftop greenhouse constructed with conjoining modular building segments is disclosed. The conjoining modular building segments are prismatic box-like structures, each prismatic box-like structure comprising at least three walls, and the prismatic box-like structures being placed side by side horizontally and mechanically attached to form the length and width of a roof of a building infrastructure. Within each box-like structure, a garden box is displaceably disposed. In certain embodiments, the prismatic box-like structures and the garden boxes have certain dimensions, comprise specific materials, or are constructed or conjoined in specific ways. At least a top wall of each prismatic box-like structure and each garden box comprises an optically transparent or semi-optically transparent material to allow the penetration of sunlight. Each prismatic box-like structure is equipped with a mechanism for lifting the garden boxes together with the top wall of the prismatic box-like structures. In certain embodiments, the prismatic box-like structures and garden boxes are also equipped with a thin insulation, a light-reflecting material, a growing medium, a grid system comprising a processor capable of controlling growing conditions within the garden boxes and connected to an automated water supply system, an automated gas supply system, an automated temperature control system, an automated shading and light control device, and artificial lighting.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
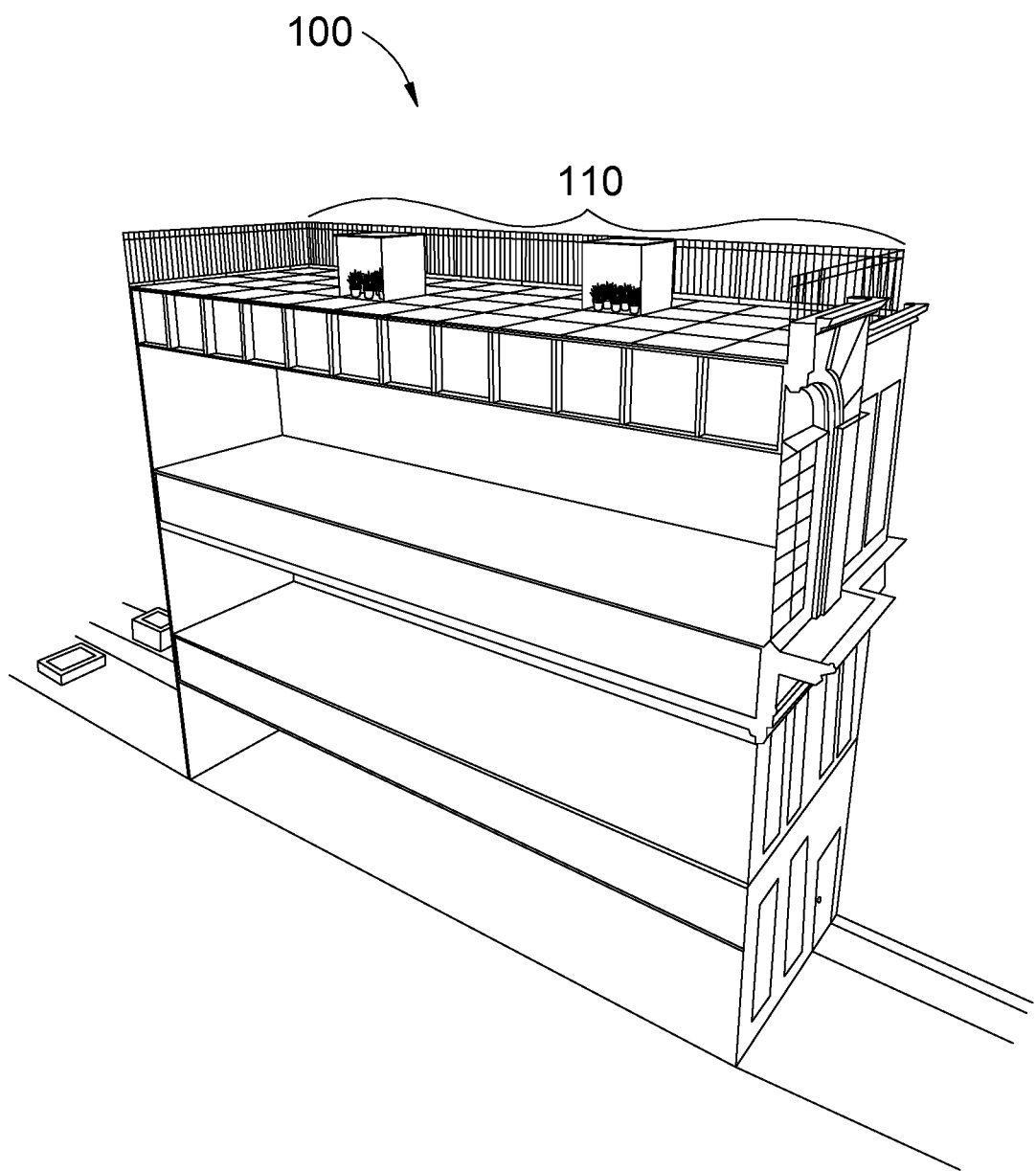
FIG. 1 depicts a perspective view of a building built in accordance with the invention.

FIG. 1 depicts one embodiment of a building 100 built in accordance with the invention. The architectural style and structure of building 100 is variable. The outermost finish of building 100 may comprise any variety of embellishments. A roof 110 of building 100 comprises a rooftop greenhouse.

Figure 2A:
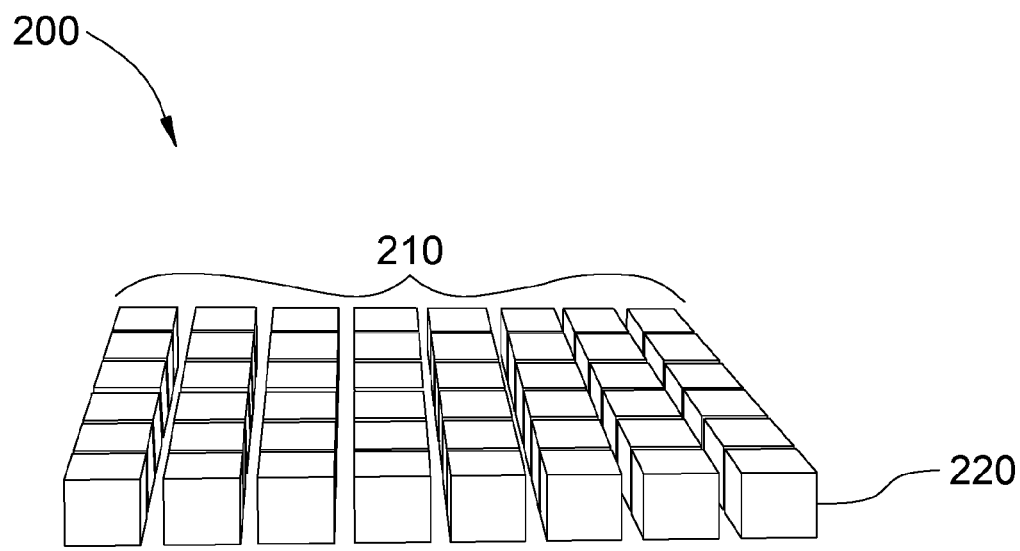
FIG. 2A depicts a perspective view of a building infrastructure built in accordance with the invention, more specifically depicting the infrastructure of a roof.
Figure 2B:
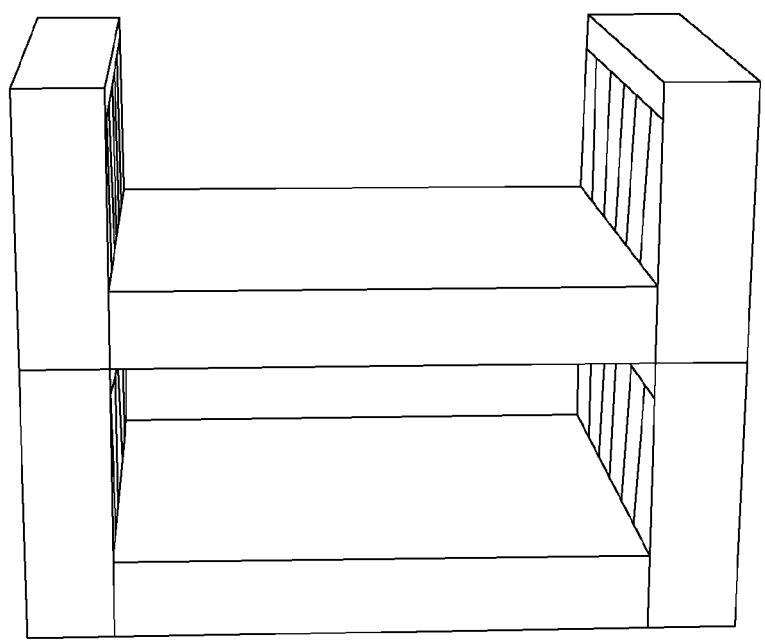
FIG. 2B depicts a perspective view of a building infrastructure built in accordance with the invention, more specifically depicting an infrastructure of walls and floors.

FIG. 2A and FIG. 2B depict a building infrastructure. A building infrastructure is an inner, unseen structural frame of the building. In particular, FIG. 2A depicts the infrastructure of a roof 200, which comprises a plurality of conjoining modular building segments 210, being prismatic box-like structures, each prismatic box-like structure 220 comprising at least three walls, and the prismatic box-like structures 220 being placed side by side horizontally and mechanically attached to form a length and width of the roof of the building infrastructure. FIG. 2B depicts an infrastructure of walls and floors 230 of the building infrastructure. In one embodiment, the infrastructure of walls and floors 230 is also built from modular building segments, comprising prismatic box-like structures. In other embodiments, the infrastructure of walls and floors 230 is built using traditional methods that utilize standardized building components that are assembled on site.

Figure 3:
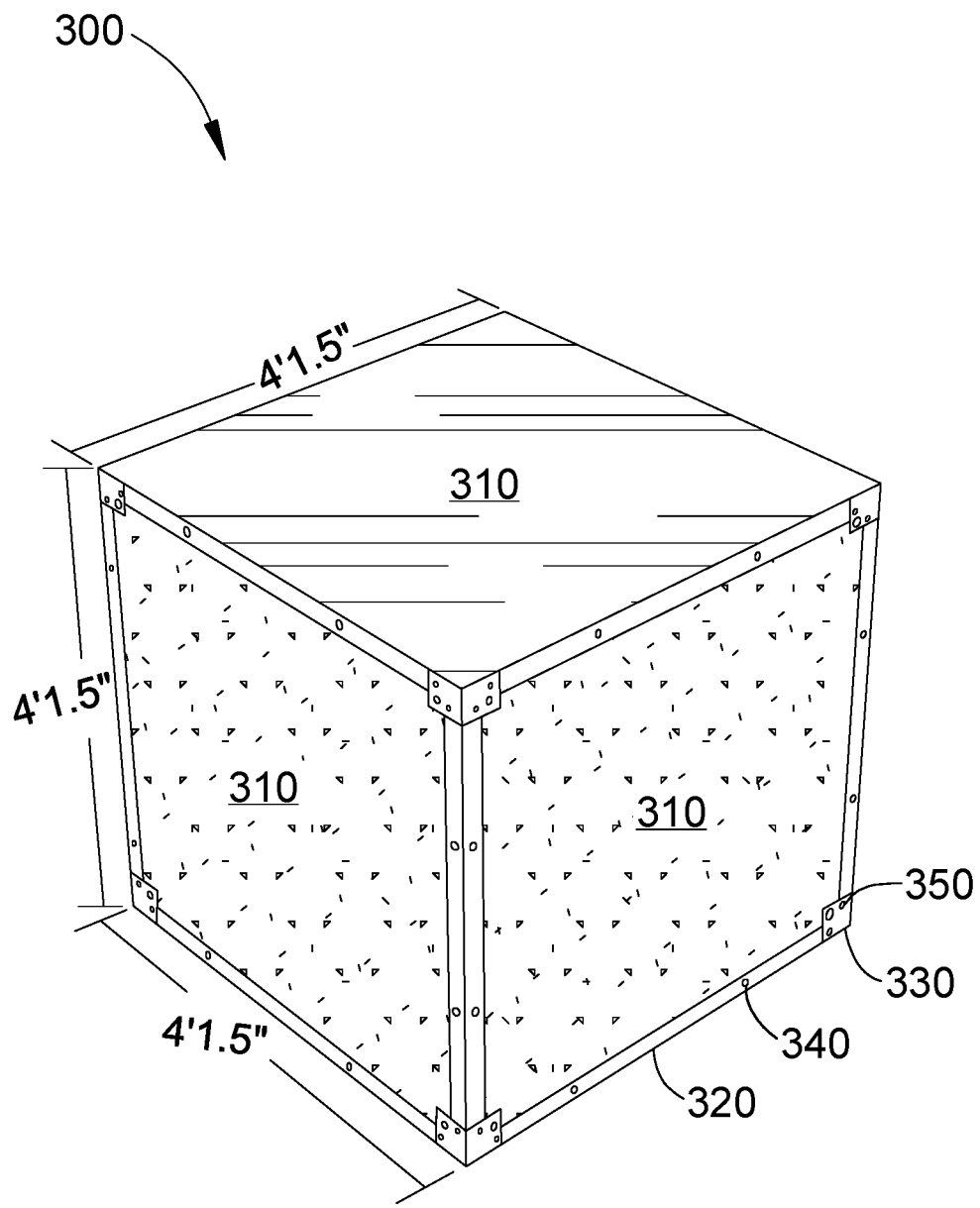
FIG. 3 depicts an exploded view of a single prismatic box-like structure.

FIG. 3 depicts a single prismatic box-like structure 300. Height, length, and width measurements of the prismatic box-like structure 300 are about four feet and one and one-half inch (1.295400 meters). A volume within the walls of the prismatic box-like structure 300 measures about 64 cubic feet (1.81228 cubic meters). The height, length, and width measurements of each prismatic box-like structure are important in creating a green or sustainable building. One characteristic of a sustainable structure is that it allows for the efficient use of space and space within a space. The inventors believe that the height, length, and width measurements and the volume of the prismatic box-like structures optimizes the usable foot print of the building and the use of space within the building. The skeletal box-like frame infrastructure of the building, unlike prior art column and beam based infrastructures, not only supports the building, but it also provides space actually within the infrastructure to accommodate habitation. The height, length, and width measurements of the prismatic box-like structures are also optimal for the rooftop greenhouse because a human arm can generally reach a comparable distance, which means that all areas of a garden box inserted inside the prismatic box-like structure would be within a gardener's reach. Furthermore, the garden box would be big enough for plants to grow, but small enough for easy maintenance. Also, because a large number of prismatic box-like structures are present within the infrastructure, each box can be used to create a separate greenhouse growing environment, such that a variety of growing environments can be created on one rooftop. Referring again to FIG. 3, in one embodiment, walls 310 of prismatic box-like structure 300 comprise an engineered material selected from a group consisting of engineered wood, composite board, particle board, press board, plywood, wood laminates, chip board, oriented strand board (OSB), gypsum board, cement board, transparent wood, and a combination thereof. The walls 310 of the prismatic box-like structure 300 are moisture resistant, termite resistant, and fire proofed. At least one wall of the prismatic box-like structure 300, and at least a top wall of the prismatic box-like structure 300, comprises an optically transparent or semi-optically transparent material, such as glass or transparent wood. The optically transparent or semi-optically transparent top wall allows sunlight to penetrate the prismatic box-like structure 300, so that the sunlight can reach to plants growing inside. Walls 310 of prismatic box-like structure 300 are joined together by means of metal plates 320 and brackets 330 mechanically secured along the perimeter of the walls. The metal plates 320 are wrapped around two adjoining wall edges and secured with connectors 340. The walls 310 of the prismatic box-like structure 300 are joined together at top and bottom edges with metal brackets 330 that are secured by connectors 350. The connectors 340 and 350 may include screws, bolts, rivet nuts, T-nuts, or other durable connectors, some of which are removable, and some of which are not.

Figure 4:
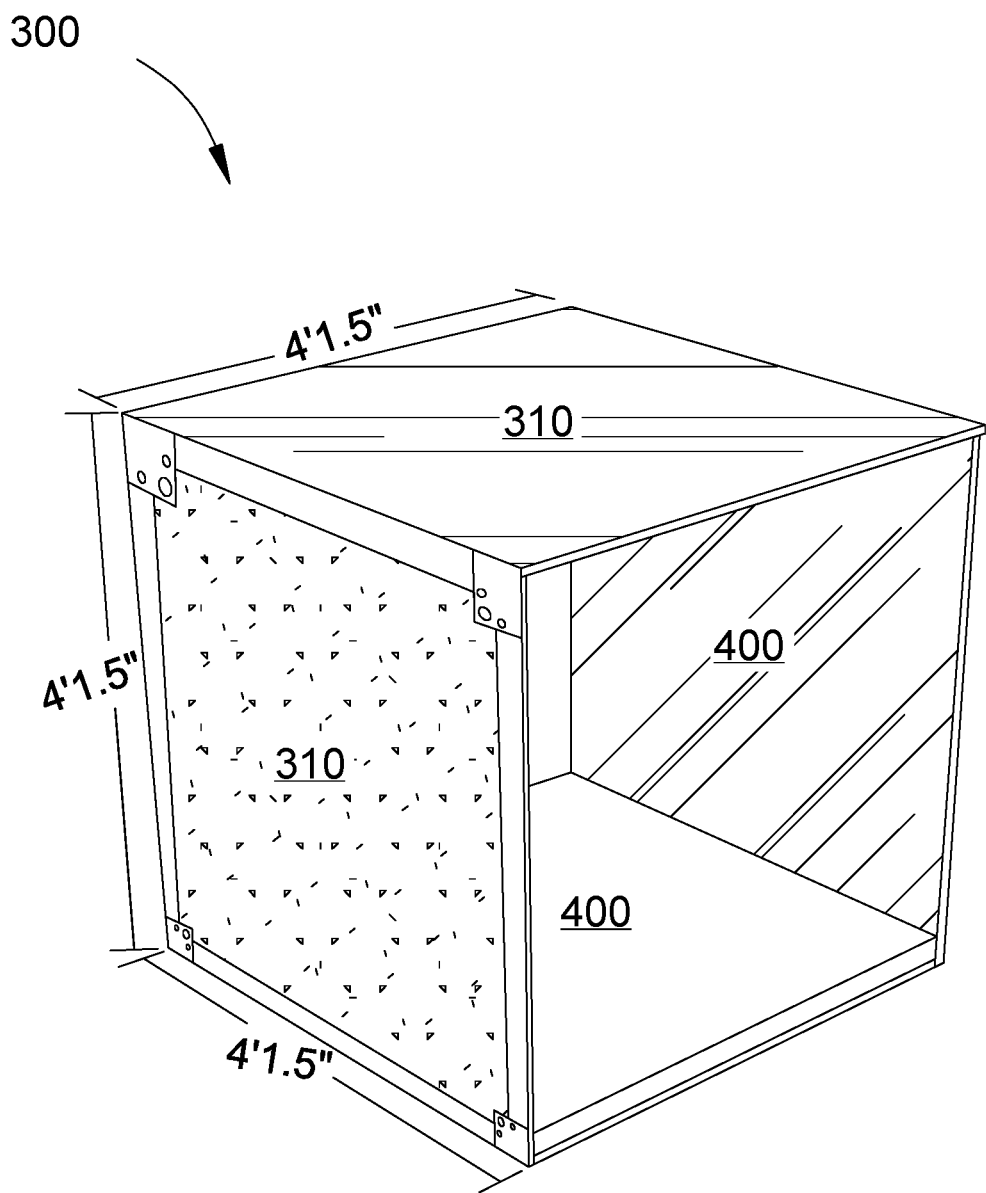
FIG. 4 depicts an exploded view of an inside of a single prismatic box-like structure.

FIG. 4 depicts an inside view of the single prismatic box-like structure 300. A bottom portion of each prismatic box-like structure 300 is layered with a thin insulation 400. This thin insulation 400 is selected from a group comprising rigid foam insulations, aerogel insulations, and spray foam insulations. Because a space between the walls 310 of each prismatic box-like structure 300 and walls of each garden box inside measures less than one inch (2.54 centimeters), the thin insulation 400 must also be less than one inch (2.54 centimeters) in thickness. In certain embodiments, at least one wall of each prismatic box-like structure 300 comprises a light-reflecting material 410. The light-reflecting material 410, such as a mirror, is attached to an inner portion of the walls 310 of the prismatic box-like structure 300. When the walls of the garden boxes are optically transparent or semi-optically transparent, as they are in certain embodiments, the light-reflecting material 410 on the walls 310 of the prismatic box-like structure 300 helps to reflect light through the walls of the garden boxes to the plants inside. In some embodiments, the walls of the garden boxes are opaque. In these embodiments, the inner walls of the prismatic box-like structures do not comprise light-reflecting material. The inner walls of the garden boxes comprise a light-reflecting material instead of the inner walls of the prismatic box-like structures.

Figure 5:
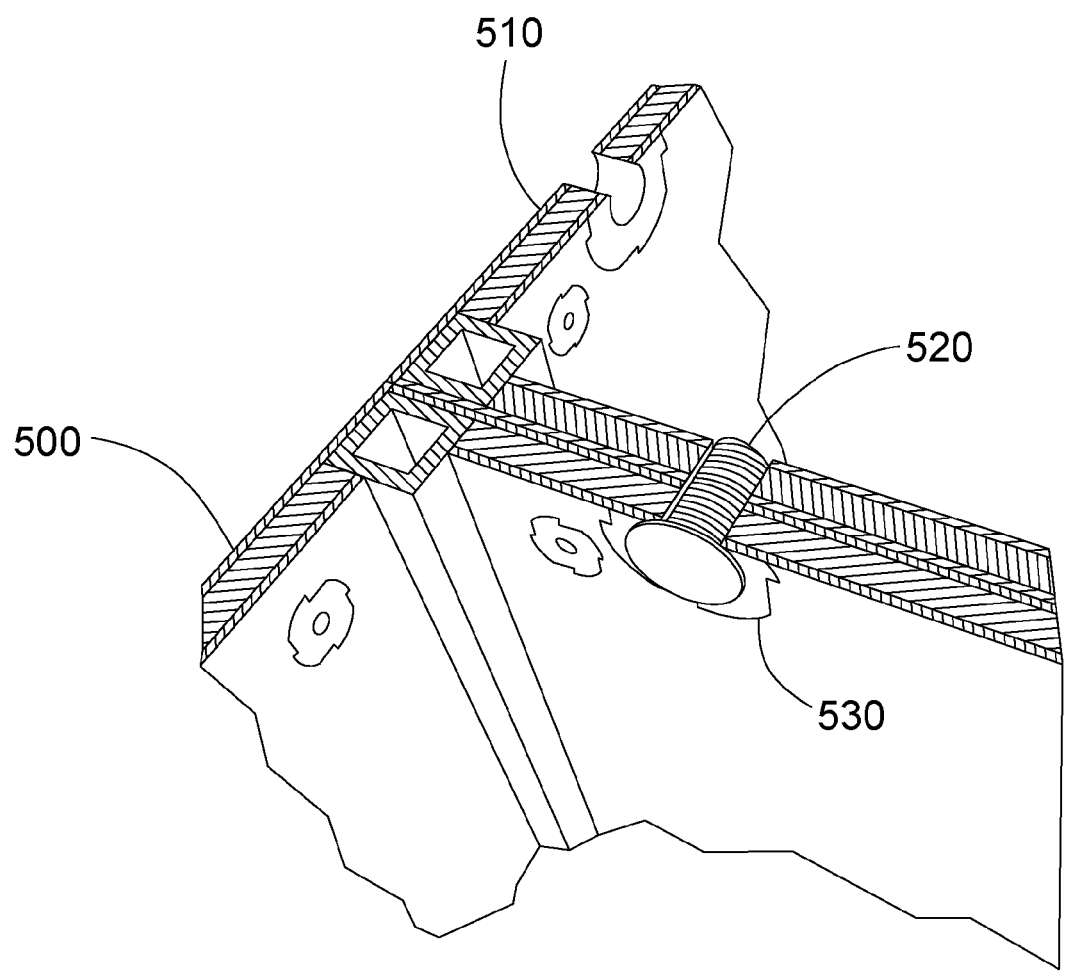
FIG. 5 depicts an exploded view of a method for attaching two prismatic box-like structures horizontally.

Referring to FIG. 5, prismatic box-like structures 500 and 510 are mechanically attached horizontally by being fastened together with connector 520 spanning between two areas 530 designated for connecting any two horizontally adjoining prismatic box-like structures. The connectors 520 may be screwed or fastened by robots, so that this process is automated and can be accomplished very quickly. In one embodiment, connectors 520 are screws and the two areas 530 designated for connecting any two horizontally adjoining prismatic box-like structures are central holes of two T-nuts.

Figure 6:
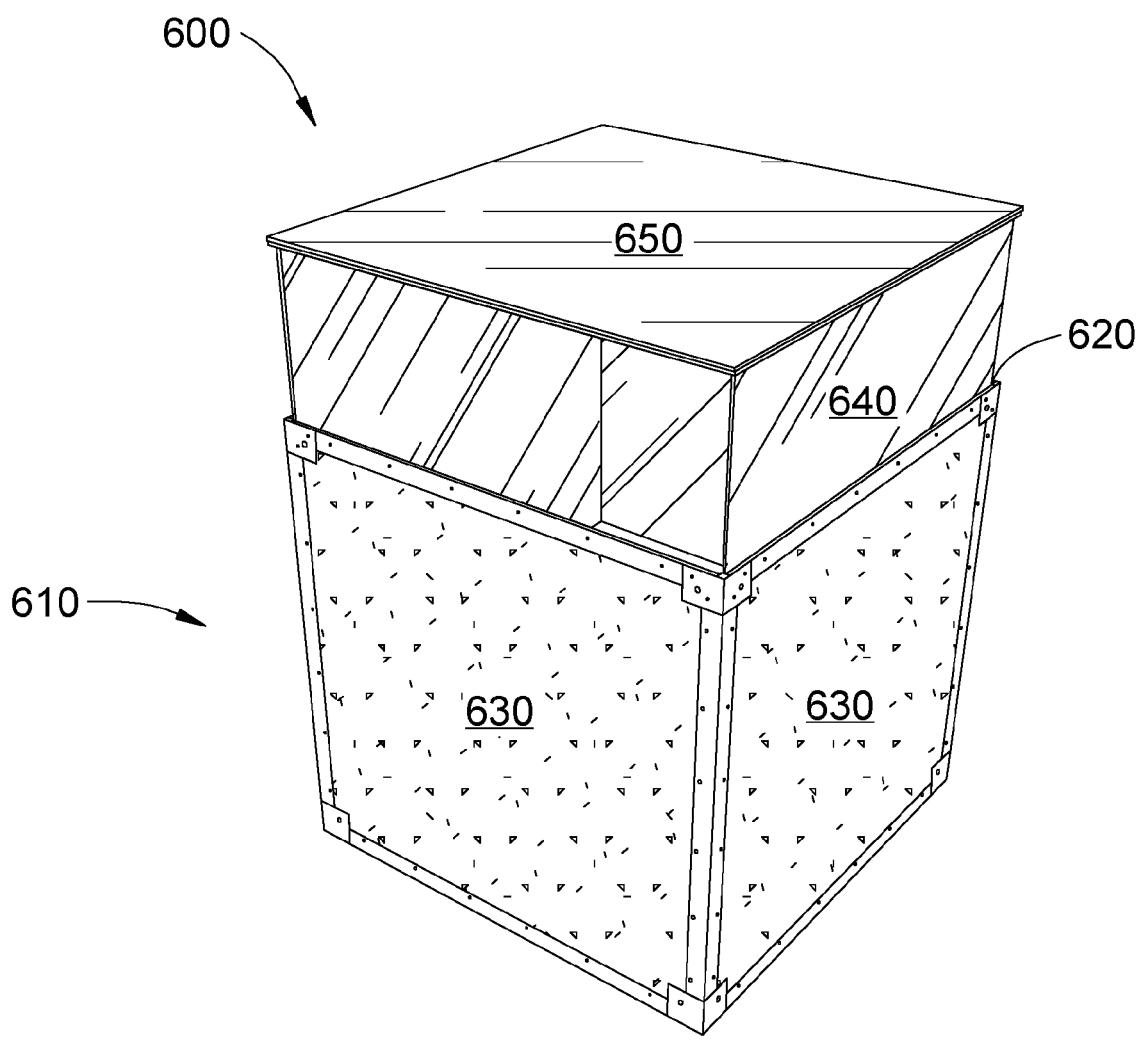
FIG. 6 depicts an exploded view of a single garden box displaceably disposed inside one of the prismatic box-like structures.

FIG. 6 depicts a single garden box 600 displaceably disposed inside one of the prismatic box-like structures 610. A space 620 between the walls 630 of each prismatic box-like structure and walls 640 of each garden box measures less than one inch (2.54 centimeters). Each garden box 600 is connected to a top wall 650 of each prismatic box-like structure 610. As depicted in FIG. 6, in one embodiment, the top wall 650 of the prismatic box-like structure 610 is also the top wall of the garden box 600. At least one wall of each garden box 600, and at least a top wall of each garden box 600, comprises an optically transparent or semi-optically transparent material, such as glass or transparent wood. The optically transparent or semi-optically transparent top wall allows sunlight to penetrate the garden box 600, so that sunlight can reach to plants growing inside. In some embodiments, all of the walls 640 of the garden boxes 600 comprise optically transparent or semi-optically transparent material. In other embodiments, the walls 640 of the garden boxes 600 comprise other materials, such as engineered wood products and plastics.

Figure 7:
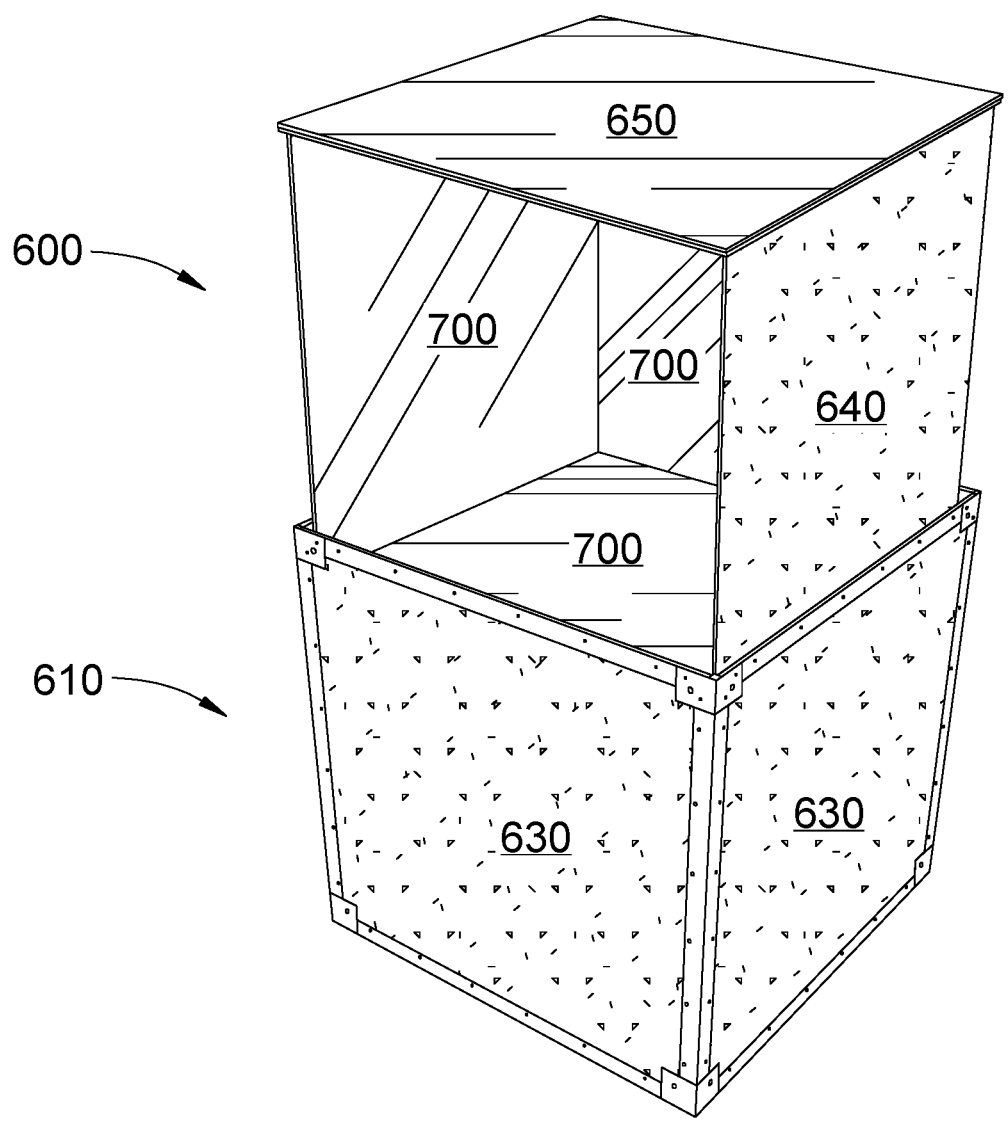
FIG. 7 depicts an exploded view of an inside of a single garden box displaceably disposed inside one of the prismatic box-like structures.

FIG. 7 depicts an inside view of garden box 600. In certain embodiments, at least one wall 640 of each garden box 600 comprises a light-reflecting material 700. The light-reflecting material 700, such as a mirror, is attached to an inner portion of the walls 640 of the garden boxes 600. The light-reflecting material 700 on the walls 640 of each garden box 600 helps to reflect light through the walls 640 of the garden boxes 600 to the plants inside. The light-reflecting material 700 is used in embodiments where the walls 640 of garden boxes 600 are not optically transparent or semi-optically transparent. In certain embodiments, all of the walls 640 of the garden boxes 600 are optically transparent or semi-optically transparent. In these embodiments, the inner walls of the garden boxes 600 do not comprise light-reflecting material 700. In these embodiments, the inner walls of the prismatic box-like structures comprise a light-reflecting material instead of the inner walls of the garden boxes. At least one wall of each garden box 600 comprises an opening that allows access to a space within each garden box. As depicted in FIG. 7, in one embodiment, the opening replaces one full wall of the garden box. In other embodiments, the opening comprises a sealable hatch or a sealable door or a window or a hole.

FIG. 8-13 depict the prismatic box-like structures equipped with a mechanism for lifting the garden boxes together with the top wall of the prismatic box-like structures. The mechanism for lifting is selected from a group comprising hydraulic and pneumatic telescoping, air bags, scissor lifts, pulley systems, linear actuators, and rack and pinion devices. The mechanism for lifting allows the garden boxes to be lifted so that they can be accessed, and also so that gardeners are not subject to back strain that results from hunching down over a garden bed.

Figure 8:
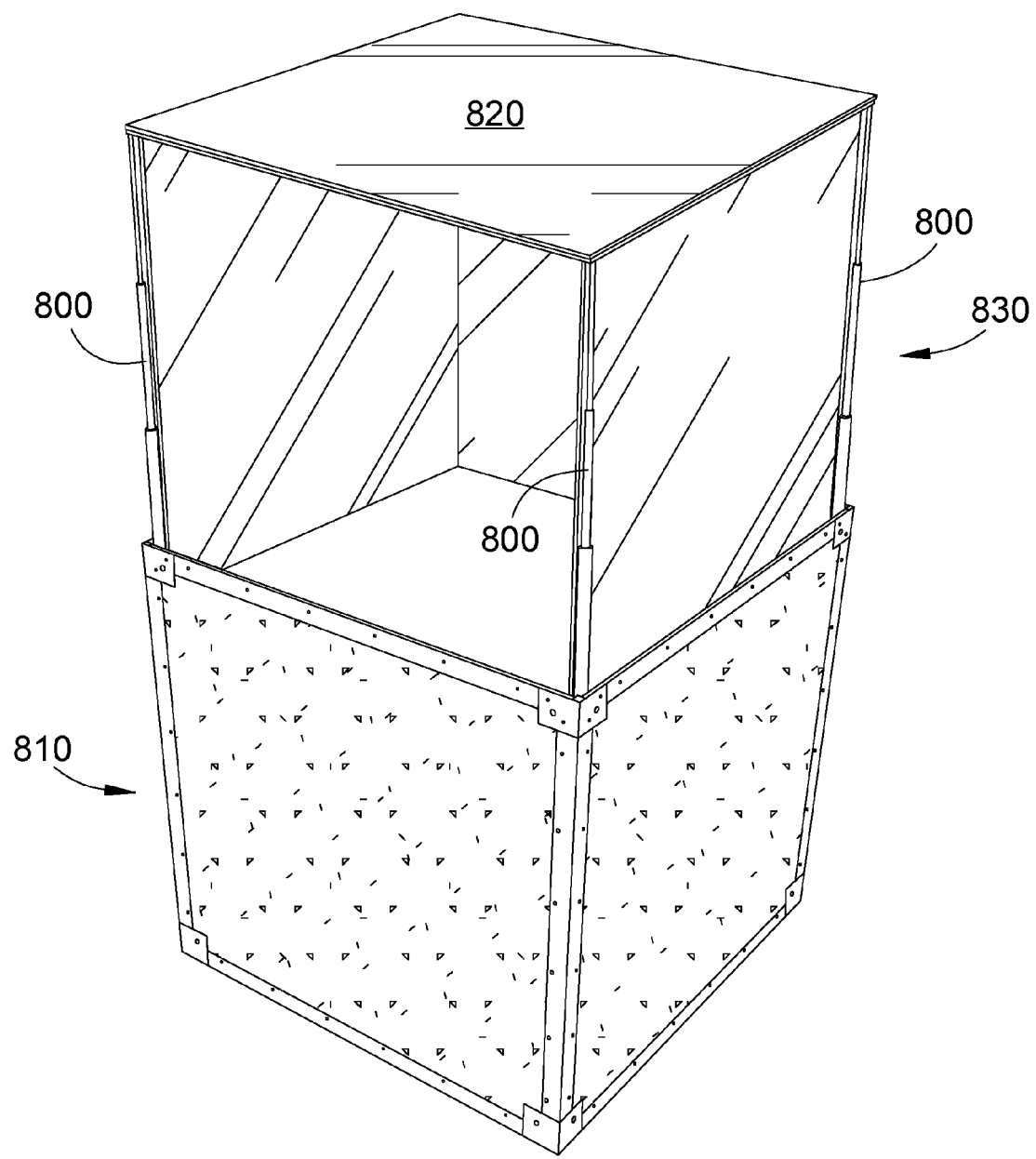
FIG. 8 depicts an exploded view of a telescoping system.

FIG. 8 depicts a telescoping system, powered by hydraulics or pneumatics. Telescoping rods 800 are secured in each corner of the prismatic box-like structure 810. The telescoping rods 800 are attached to the top wall 820 of the prismatic box-like structure 810. By power of water or air, the telescoping rods 800 rise, lifting the top wall 820 of the prismatic box-like structure 810. Garden box 830, which is attached to the top wall 820 of the prismatic box-like structure 810, rises with the top wall 820 of the prismatic box-like structure 810.

Figure 9:
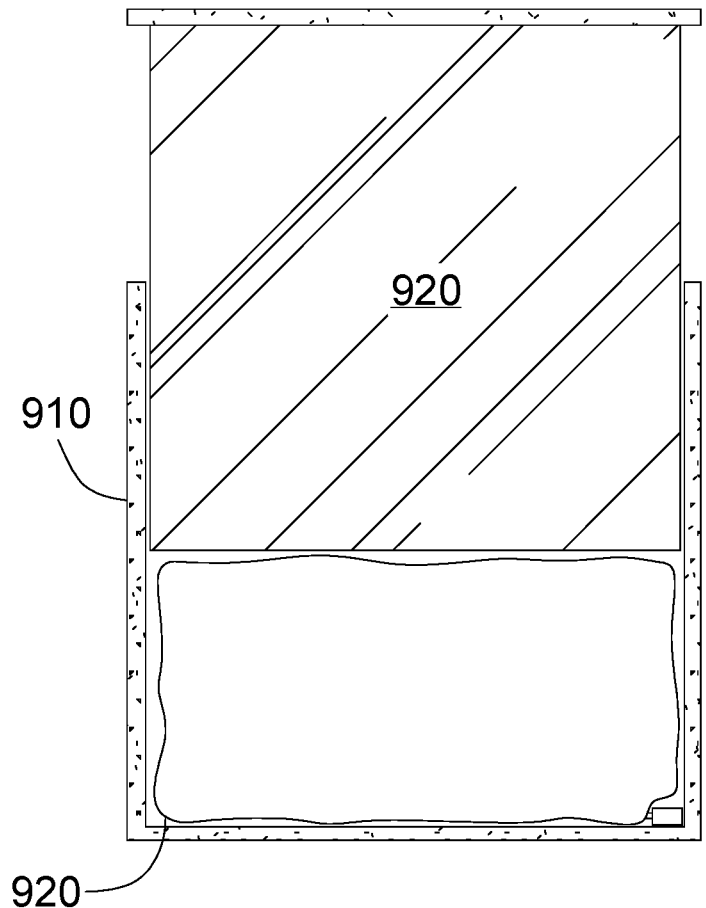
FIG. 9 depicts an exploded view of an air bag system.

FIG. 9. depicts an air bag system. An air bag 900 is sandwiched between prismatic box-like structure 910 and garden box 920. When the air bag 900 is inflated, garden box 920 rises.

Figure 10:
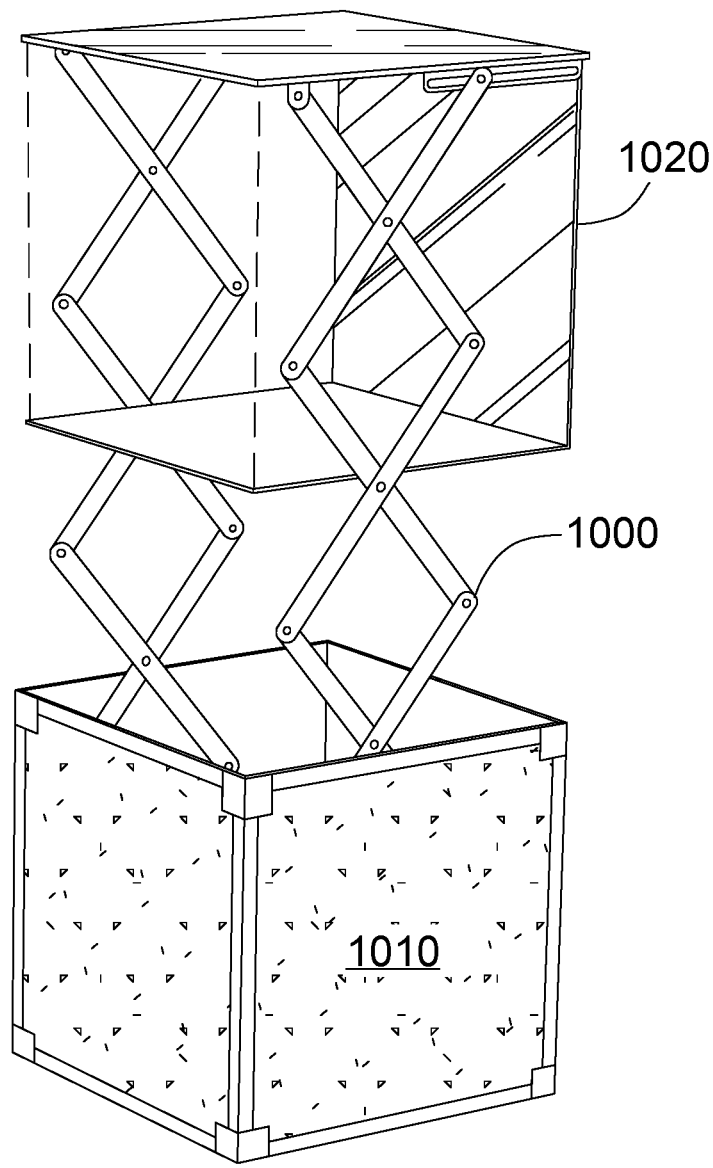
FIG. 10 depicts an exploded view of a scissor lift system.

FIG. 10 depicts a scissor lift system. A scissor lift 1000 is inserted in the space between the walls of each prismatic box-like structure 1010 and walls of each garden box 1020. The scissor lift 1000 is equipped with a motor and a pulley. When the motor is activated, the pulley lifts arms of the scissor lift 1000, which are attached to the top wall of prismatic box-like structure 1010, which is attached to garden box 1020. When the scissor lift 1000 is extended, garden box 1020 rises out of prismatic box-like structure 1010.

Figure 11:
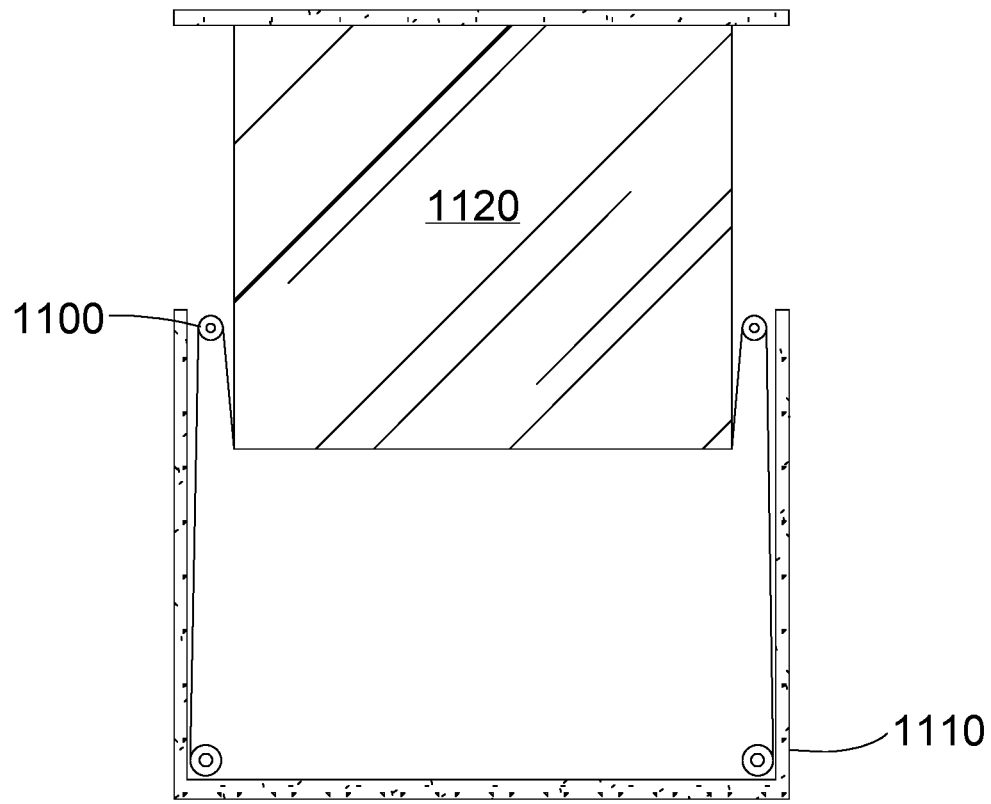
FIG. 11 depicts an exploded view of a pulley system.

FIG. 11 depicts a pulley system. A pulley 1100 is secured underneath garden box 1120. When the pulley 1100 is activated, garden box 1120 is lifted out of prismatic box-like structure 1110.

Figure 12:
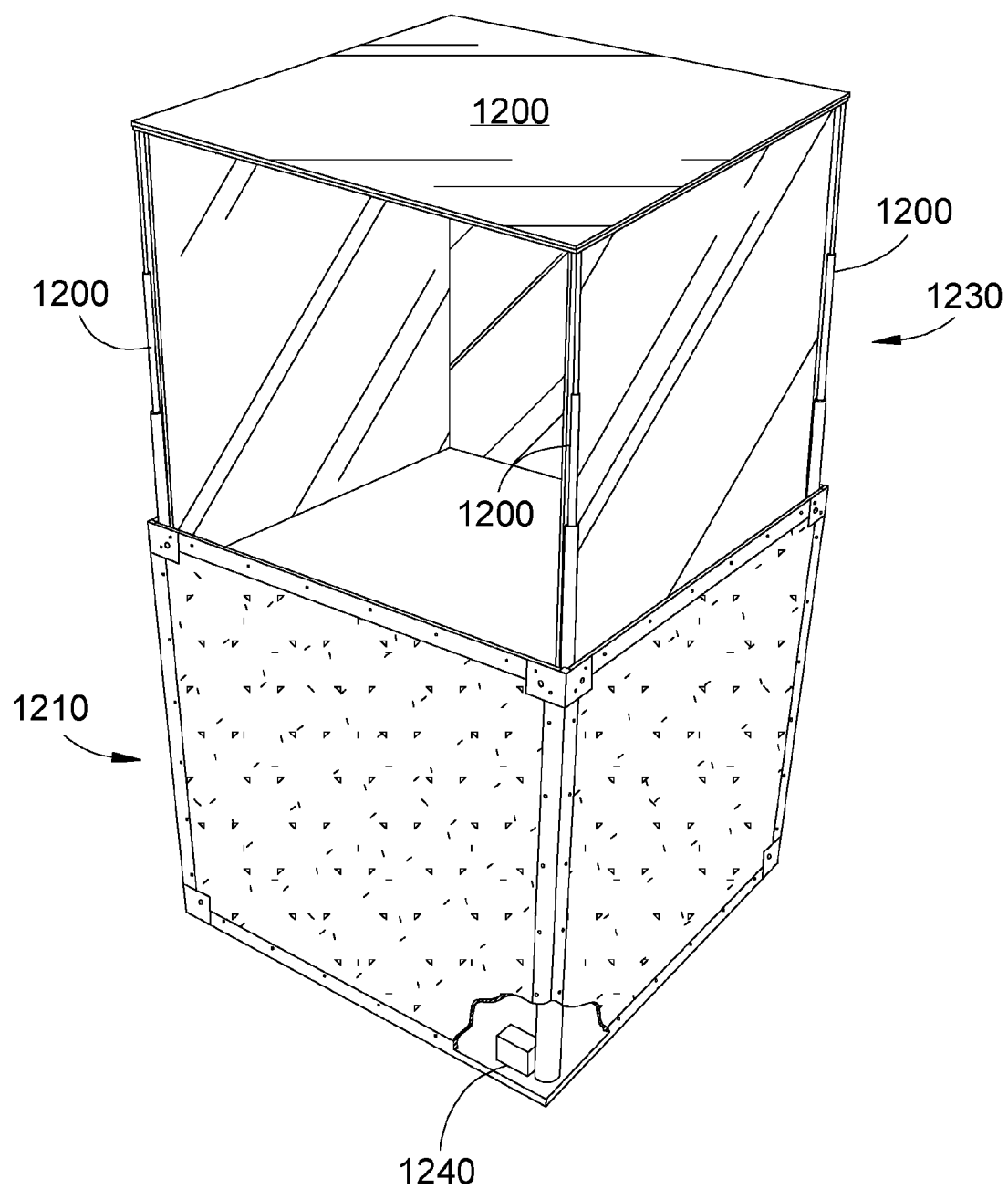
FIG. 12 depicts an exploded view of a linear actuator system.

FIG. 12 depicts a linear actuator system. A linear actuator 1200 is secured in each corner of the prismatic box-like structure 1210. The linear actuator 1200 is attached to the top wall 1220 of the prismatic box-like structure 1210. Each linear actuator 1200 is equipped with a motor 1240. When the motor 1240 is activated, the linear actuator 1200 rises, lifting the top wall 1220 of the prismatic box-like structure 1210. Garden box 1230, which is attached to the top wall 1220 of the prismatic box-like structure 1210, rises with the top wall 1220 of the prismatic box-like structure 1210.

Figure 13:
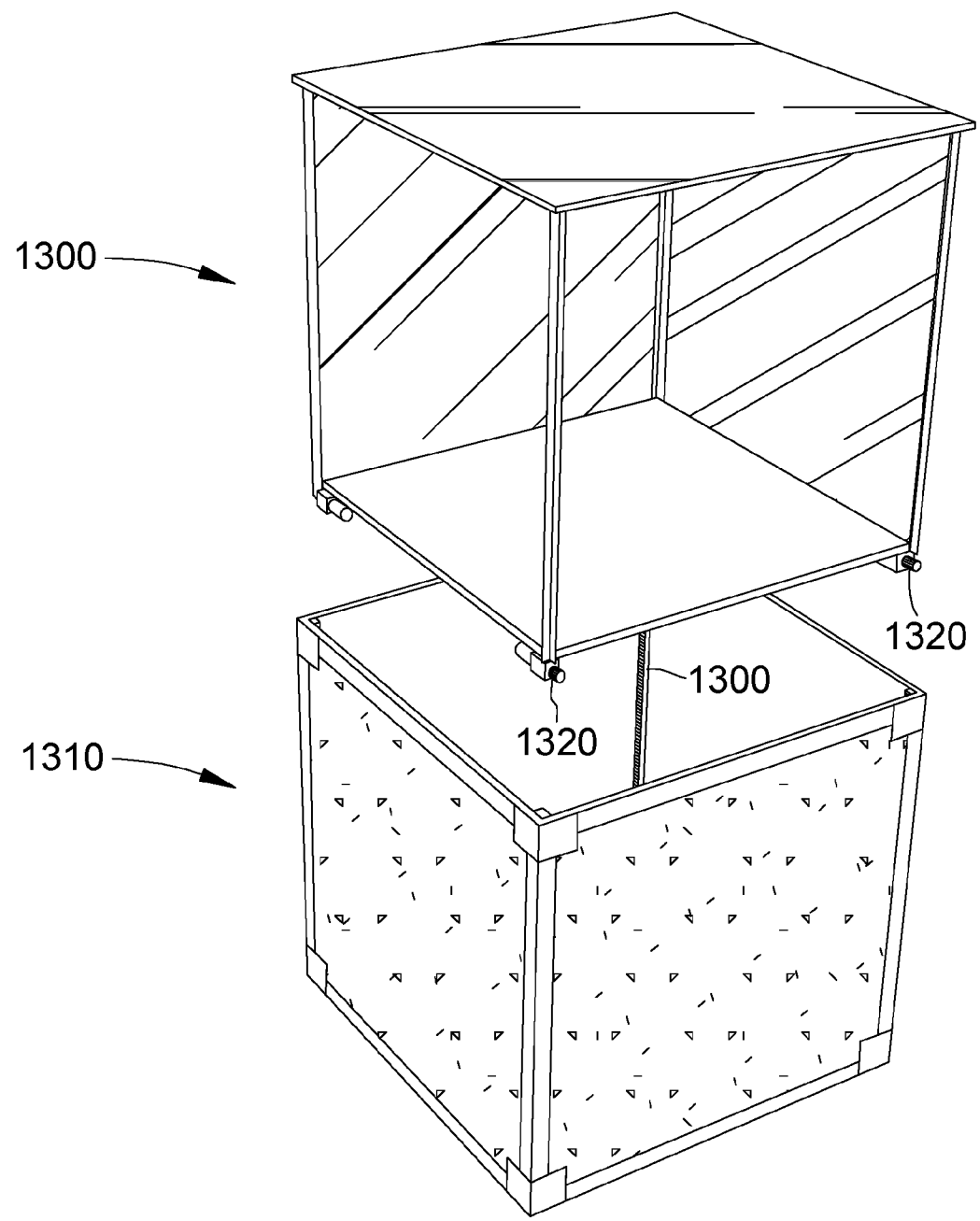
FIG. 13 depicts an exploded view of a rack and pinion system.

FIG. 13 depicts a rack and pinion system. A rack 1300 is secured in each corner of prismatic box-like structure 1310. A pinion 1320 is secured on each bottom corner of garden box 1330. When gears of the pinion 1320 engage with teeth of the rack 1300, linear motion is created, lifting garden box 1330 out of prismatic box-like structure 1310.

Figure 14:
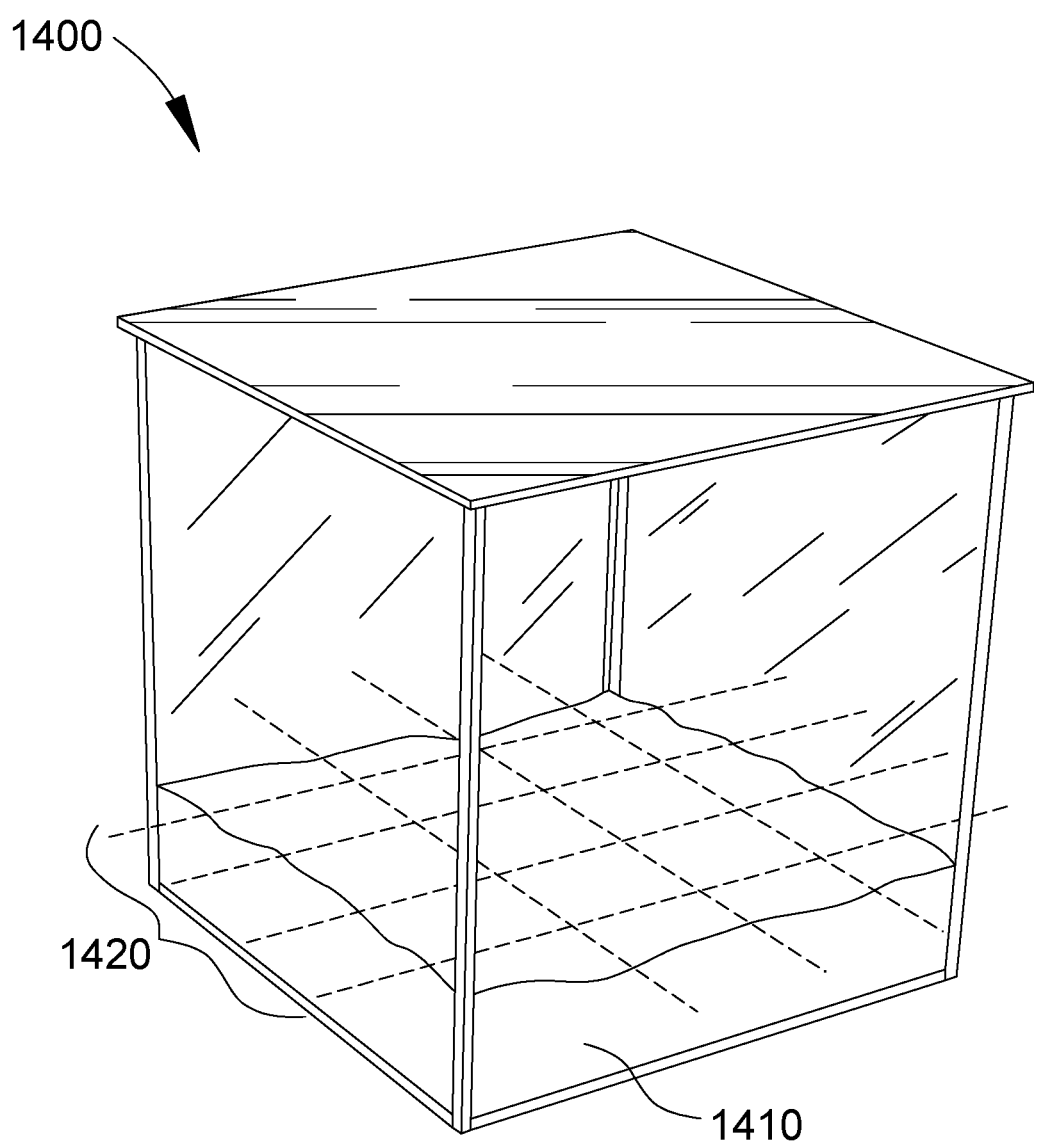
FIG. 14 depicts an exploded view of one embodiment of a garden box storing a growing medium, and the growing medium divided according to a grid system.

FIG. 14 depicts one embodiment of garden box 1400. In this embodiment, garden box 1400 stores a growing medium 1410 selected from a group comprising natural and synthetic soil and natural and synthetic soil alternatives. In other embodiments that use hydroponic or aeroponic systems, no growing medium is necessary. Garden box 1400 is also equipped with a grid system 1420 that divides the garden box 1400, and therefore also the growing medium 1410, into sections. FIG. 14 depicts a top view of an outline of the grid system 1420. The grid system 1420 is not actually visible from this view. The grid system 1420 may comprise a processor for controlling growing conditions within the garden box 1400. The processor, not shown, may be connected to an automated water supply system, an automated gas supply system, an automated temperature control system, an automated shading and light control device, and artificial lighting.

Figure 15A:
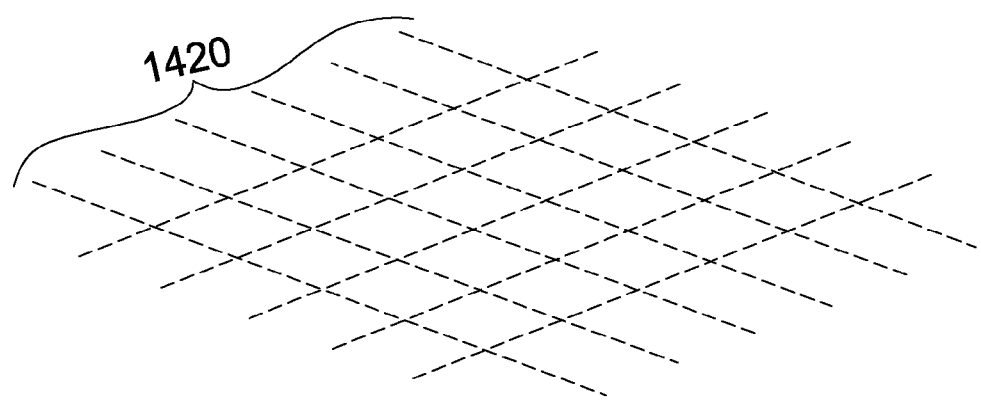
FIG. 15A depicts an exploded top view of an outline of the grid system.
Figure 15B:
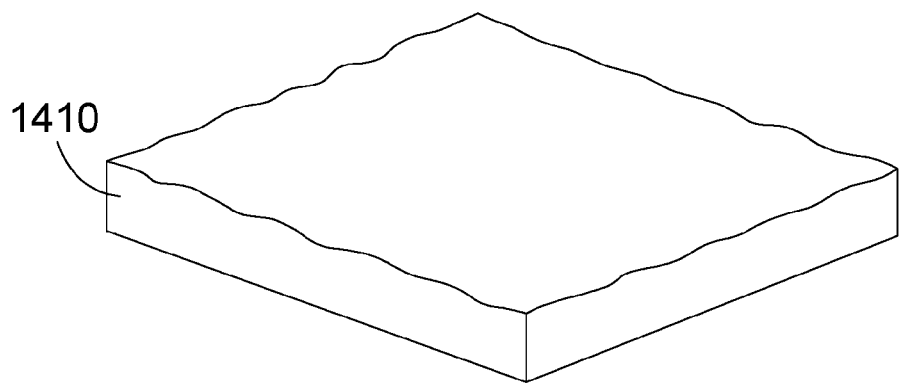
FIG. 15B depicts an exploded view of a growing medium.
Figure 15C:
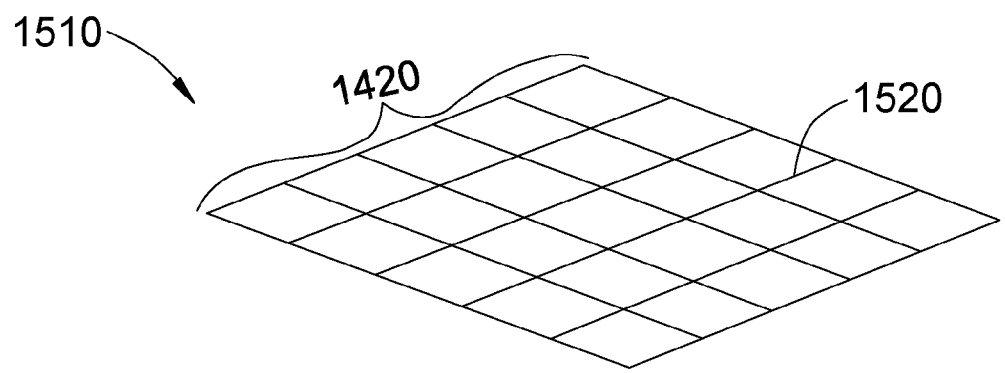
FIG. 15C depicts an exploded view of a bottom wall of each garden box, divided into sections according to a grid system.

FIG. 15A, FIG. 15B, and FIG. 15C depict an exploded view of the grid system 1420 and the growing medium 1410. FIG. 15A depicts a top view of an outline of the grid system 1420. The grid system is not actually visible from a top view due to the presence of a growing medium. FIG. 15B depicts a growing medium 1410. The growing medium 1410 is selected from a group comprising natural and synthetic soil and natural and synthetic soil alternatives. FIG. 15C depicts a bottom wall 1510 of each garden box. The bottom wall 1510 is unseen from a top view of the garden box if the garden box stores a growing medium. Therefore, the grid system 1420 may be unseen unless observed from underneath each garden box. Each bottom wall 1510 of each garden box is divided into sections according to grid system 1420. The sections are marked by metal rods 1520 equipped with automated sensors connected to a processor, not shown. Each section receives different determined amounts of nutrients, water, and gas based on the nature, variety, and quantity of plants within the garden boxes. The different determined amounts of nutrients, water, and gas are monitored by the automated sensors within the grid system and the processor controls growing conditions within the garden box based on inputs from the sensors.

Figure 16:
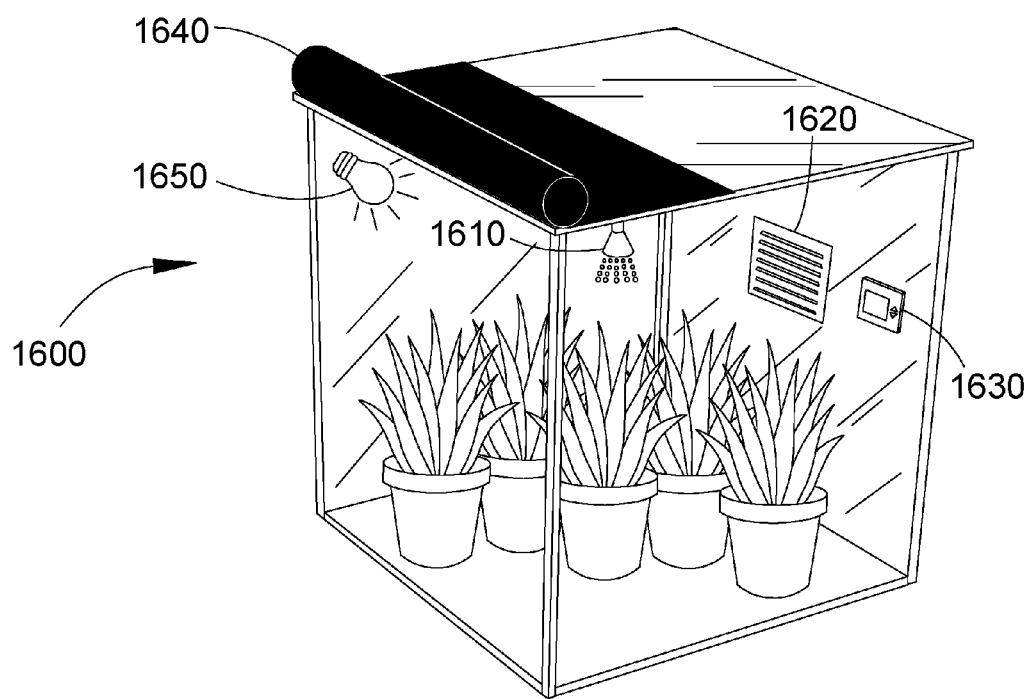
FIG. 16 depicts an exploded view of one embodiment of a garden box equipped with an automated water supply system, an automated gas supply system, an automated temperature control system, an automated shading and light control device, and artificial lighting.

FIG. 16 depicts one embodiment of one garden box 1600 equipped with an automated water supply system, an automated gas supply system, and an automated temperature control system. In certain embodiments, water is supplied by utilizing hydroponic or aeroponic techniques. In other embodiments, drip irrigation, sprinkler, and misting systems are used. FIG. 16 depicts a sprinkler system 1610. The gas supply system utilizes intake air ducts with one-way vent fans located throughout the building. Gases that are beneficial for a growing environment, such as carbon dioxide and nitrogen, are captured and delivered to the garden boxes through vents 1620. The temperature control system utilizes temperature sensing devices and heat pumps. FIG. 16 also depicts a temperature sensing device 1630. Air ducts connect the heat pumps to the garden boxes. Each air duct is equipped with an air valve that controls the release of air into the garden boxes. The water supply, the air supply, and the temperature of each garden box is controlled separately. This allows gardeners to create a variety of growing environments on just one rooftop. Because the garden boxes move up and down, flexible pipe connections are utilized.

Furthermore, FIG. 16 depicts an automated shading and light control device 1640 attached to the top wall of the prismatic box-like structure and garden box 1600. The automated shading and light control device 1640 controls how much sunlight enters each garden box. This also helps to control temperature within the garden box. In one embodiment, the garden boxes are further equipped with artificial lighting 1650, so that light can be controlled inside and outside.

The invention claimed is:

1. A rooftop greenhouse comprising:
   a plurality of conjoining modular building segments, being prismatic box structures, each prismatic box structure comprising at least three walls, and the prismatic box structures being placed side by side horizontally and mechanically attached to form a roof of a building infrastructure; and
   a plurality of garden boxes, each garden box displaceably disposed inside one of the prismatic box structures,
   wherein the prismatic box structures are each equipped with a mechanism that lifts the garden boxes together with a top wall of the prismatic box structures, and wherein the mechanism is selected from a group comprising telescoping rods, hydraulic and pneumatic telescoping systems, air bags, scissor lifts, pulley systems, linear actuators, and rack and pinion devices.

2. The rooftop greenhouse of claim 1, wherein height, length, and width measurements of the prismatic box structures are about 4 feet and 1.5 inches.

3. The rooftop greenhouse of claim 1, wherein a volume within the walls of the prismatic box structures measures about 64 cubic feet.

4. The rooftop greenhouse of claim 1, wherein the walls of the prismatic box structures comprise an engineered material selected from a group consisting of engineered wood, composite board, particle board, press board, plywood, wood laminates, chip board, oriented strand board (OSB), gypsum board, cement board, transparent wood, and a combination thereof.

5. The rooftop greenhouse of claim 1, wherein at least one wall of the prismatic box structures comprises an optically transparent or semi-optically transparent material.

6. The rooftop greenhouse of claim 1, wherein at least one wall of each prismatic box structure comprises a light-reflecting material.

7. The rooftop greenhouse of claim 1, wherein the walls of the prismatic box structures are joined together by means of metal plates and brackets mechanically secured along a perimeter of said walls.

8. The rooftop greenhouse of claim 1, wherein the prismatic box structures are mechanically attached horizontally by being fastened together with a connector spanning between any two horizontally adjoining prismatic box structures.

9. The rooftop greenhouse of claim 1, wherein a bottom portion of each prismatic box structure is layered with a thin insulation.

10. The rooftop greenhouse of claim 1, wherein a space between the walls of each prismatic box structure and walls of each garden box measures less than one inch.

11. The rooftop greenhouse of claim 1, wherein at least one wall of each garden box, and at least a top wall of each garden box, comprises an optically transparent or semi-optically transparent material.

12. The rooftop greenhouse of claim 1, wherein at least one wall of each garden box comprises a light-reflecting material.

13. The rooftop greenhouse of claim 1, wherein at least one wall of each garden box comprises an opening that allows access to a space within each garden box.

14. The rooftop greenhouse of claim 1, wherein each garden box is connected to a top wall of each prismatic box structure.

15. The rooftop greenhouse of claim 1, wherein each garden box stores a growing medium selected from a group comprising soil and soil alternatives.

16. The rooftop greenhouse of claim 1, wherein each garden box is equipped with a grid system that divides the garden box into sections, each section receiving different determined amounts of nutrients, water, and gas, and the different determined amounts of nutrients, water, and gas monitored by automated sensors within the grid system.

17. The rooftop greenhouse of claim 1, further comprising an automated water supply system, an automated gas supply system, and an automated temperature control system.

18. The rooftop greenhouse of claim 1, wherein automated shading and light control devices are attached to the top walls of the prismatic box structures.

* * * * *